US005827389A

United States Patent [19]

Takizawa et al.

[11] Patent Number: 5,827,389

[45] Date of Patent: Oct. 27, 1998

[54] PRINTED LABEL, METHOD AND APPARATUS FOR MANUFACTURING PRINTED LABELS, AND METHOD AND APPARATUS FOR ATTACHING PRINTED LABELS

[75] Inventors: Yoshinobu Takizawa, Urawa; Fumihiko Goto, Sitama-ken, both of Japan

[73] Assignee: Lintec Corporation, Tokyo, Japan

[21] Appl. No.: 962,843

[22] Filed: Nov. 3, 1997

Related U.S. Application Data

[63] Continuation of Ser. No. 490,485, Jun. 14, 1995, abandoned.

[30] Foreign Application Priority Data

| | | | |
|---|---|---|---|
| Jun. 14, 1994 | [JP] | Japan | 6-155291 |
| Sep. 9, 1994 | [JP] | Japan | 6-242129 |
| Mar. 31, 1995 | [JP] | Japan | 7-099894 |

[51] Int. Cl.[6] .................. B32B 31/00

[52] U.S. Cl. .................. 156/234; 156/238; 156/277; 156/289; 156/387; 156/541

[58] Field of Search .................. 156/230, 234, 156/238, 277, 289, 384, 387, 540, 541, 542

[56] References Cited

U.S. PATENT DOCUMENTS

| | | | |
|---|---|---|---|
| 4,068,028 | 1/1978 | Samonides | 428/40 |
| 4,276,112 | 6/1981 | French et al. | 156/360 |
| 4,661,189 | 4/1987 | Voy et al. | 156/248 |
| 4,960,482 | 10/1990 | Crane et al. | 156/277 |
| 5,022,947 | 6/1991 | Hasegawa et al. | 156/277 |
| 5,022,954 | 6/1991 | Plaessmann | 156/542 |

FOREIGN PATENT DOCUMENTS

| | | |
|---|---|---|
| 0 225 301 | 6/1987 | European Pat. Off. . |
| 0 287 695 | 10/1988 | European Pat. Off. . |
| 0 476 447 | 3/1992 | European Pat. Off. . |
| 0 546 650 | 6/1993 | European Pat. Off. . |
| 2529167 | 12/1983 | France . |
| 3-31776 | 3/1991 | Japan . |

*Primary Examiner*—James Sells
*Attorney, Agent, or Firm*—Lowe Hauptman Gopstein Gilman & Berner

[57] ABSTRACT

A material sheet assembly in which a label base attached to a release liner by means of an adhesive is set in roll form is used. In a step in which the material sheet assembly is continuously fed out, the release liner is released by leaving the adhesive on the label base, and the release liner is consecutively taken up. By using a noncontact-type printer, printing is effected on the adhesive surface of the label base separated from the release liner to form a printed label. The printed label is in such a form that the printed surface is disposed between the label base and an adherend. The labels can be attached immediately after they are manufactured, and they can be stored or transported by being taken up in roll form while an additional release liner is attached to the printed surface side.

8 Claims, 8 Drawing Sheets

PRINTED LABEL, METHOD AND APPARATUS FOR MANUFACTURING PRINTED LABELS, AND METHOD AND APPARATUS FOR ATTACHING PRINTED LABELS

This application is a continuation of application Ser. No. 08/490,485 fled Jun. 14, 1995 abandoned.

BACKGROUND OF THE INVENTION

1. Field of the Invention

The present invention relates to a printed label, a method and an apparatus for manufacturing printed labels, and a method and an apparatus for attaching printed labels, and more particularly to a printed label in which the number of layers of the label attached to an adherend such as various containers is reduced, and a method and an apparatus for attaching printed labels to predetermined adherends while manufacturing the printed labels in a series of process.

2. Description of the Related Art

Conventionally, printed labels are known in which a predetermined printing is effected on a resin film and which can be attached to various adherends such as boxes. As a conventional structure of such a printed label, an arrangement is adopted in which an adhesive is provided on both surfaces of a base such as paper, a film, or the like, a release film is attached to the surface of the adhesive provided on one side, printing is effected on the surface of the adherend on the other side by an ink-jet printer, and a transparent lamination film is attached to that surface (e.g., Japanese Utility Model Publication Laid-Open No. 3-31776).

When the printed label is attached to an adherend, the release film on the side opposite to the printing side is released from the base, and the adhesive exposed to the surface is made to adhere to the adherend. Accordingly, since printed characters, codes, or the like are covered with the lamination film, it is possible to effectively avoid the print from becoming peeled off after the label is attached to the adherend. Hence, there is an advantage in that a display effect can be continued stably.

With the above-described printed label, however, in the state in which the label is attached to the adherend, the label has the base, the adhesive provided on both surfaces of the base, and the lamination film. Thus, there have been drawbacks in that the printed label as a whole is provided with a multilayered structure in which the number of component layers is four, and the number of steps of manufacturing the printed label unavoidably increases, leading to an increase in the cost of manufacturing the printed labels.

In addition, according to the above-described printed label having the multilayered structure, there is naturally a limit to making the thickness of the overall printed label thin. Accordingly, in the state in which the printed label is attached to an adherend, a fixed stepped portion is formed between the surface of the lamination film and the surface of the adherend where the label is not attached. As a result, there is a drawback in that the printed label is liable to be peeled off due to the adhering strength of the adhesive.

SUMMARY OF THE INVENTION

Accordingly, an object of the present invention is to provide a printed label in which the number of layers is substantially reduced while effectively maintaining the existing effects of preventing the peeling off and staining of the printed characters, codes, or the like, so as to simplify the structure and effect a reduction in the manufacturing cost.

Another object of the present invention is to provide a method and an apparatus for manufacturing printed labels which make it possible to speedily form printed labels by using a general material sheet assembly in which a belt-shaped label base is attached to a belt-shaped release liner.

Still another object of the present invention is to provide a method and an apparatus for manufacturing printed labels which permit the storage or transportation of the printed labels and are suitable for attaching the printed labels in a separate process, as required.

A further object of the present invention is to provide a method and an apparatus for manufacturing printed labels continuously in a series of steps and consecutively attaching the printed labels to predetermined adherends.

A printed label according to the present invention comprises: a label base formed in a predetermined planar shape; an adhesive provided on a part or all of one surface of the label base, wherein printing is effected on the surface of the printed label where the adhesive is provided, by using a noncontact-type printer.

A method of manufacturing printed labels according to the present invention comprises the steps of: separating a label base attached to a release liner by means of an adhesive from the release liner, together with the adhesive; and forming a printed label by printing on the surface of the printed label where the adhesive is provided, by using a noncontact-type printer.

In another method of manufacturing printed labels, a technique is adopted in which by using a material sheet assembly in which a first release liner is attached to a label base by means of an adhesive, the first release liner is separated and taken up by leaving the adhesive on the label base, and printing is effected on a surface of the adhesive by means of a noncontact-type printer while the separated label base is being fed out in a predetermined direction, so as to obtain the printed label. Here, it is preferable to jointly use a technique in which after a second release liner is attached to a printed surface side of the printed label, slits are provided in the label base in such a manner as to surround each predetermined printing unit, and while collecting an outer portion of the label located outside the slits, perforations are formed in the second release liner at fixed intervals before the printed labels are consecutively taken up.

In accordance with the present invention, there is provided an apparatus for manufacturing printed labels by using a material sheet assembly in which a first release liner is attached to a label base by means of an adhesive, comprising: a material-sheet holding roll for holding the material sheet assembly in such a manner as to be capable of feeding out the material sheet assembly continuously; a take-up device for taking up the first release liner by leaving the adhesive on the label base; a feeding device coupled to a predetermined driving means and capable of feeding out the separated label base; and a noncontact-type printer for forming the printed labels by effecting printing on a surface of the adhesive.

In the apparatus for manufacturing printed labels, an arrangement is preferably provided in which a release-liner supplying mechanism is provided in a stage following the feeding device so as to supply a second release liner, wherein the second release liner supplied by the release-liner supplying mechanism is attached to a printed surface side of the printed label. In this arrangement, it is possible to attach the second release liner to the printing surface side, and the printed labels can be stored or transported without being immediately attached to adherends.

In addition, an arrangement is preferably provided in which a first die cutter is disposed along a direction in which the printed labels with the second release liner attached thereto are fed, wherein slits are formed in the label base by the first die cutter in such a manner as to surround the printed label for each predetermined printing unit. Here, a collecting device is disposed in a stage following the first die cutter so as to for collect an outer portion of the printed label slit to a shape of the printed label by the first die cutter. The first die cutter is capable of forming slits for each predetermined printing unit, thereby forming the label base into the shape of a final label. The outer portion of the label base located outside the slits formed by the first die cutter is collected by a taking-up means or the like by using the collecting device. Consequently, only the printed labels formed into the shape of final labels remain on the second release liner. These printed labels together with the second release liner are taken up by a take-up device.

Furthermore, a label take-up device is disposed in a final stage as in the direction in which the printed labels are fed. By virtue of this label take-up device, the manufactured printed labels can be formed into the form of a roll to permit storage. In addition, it is possible to adopt an arrangement in which a second die cutter is disposed in a stage preceding the label take-up device, and perforations are formed in the second release liner by this second die cutter. The perforations formed by the second die cutter are used to determine the presence or absence of the relevant printed label in a case where the printed labels formed by a transparent label base are set in an automatic attaching apparatus. That is, an appropriate optical sensor or the like is disposed at a position along the moving path of the perforations, and the presence of the printed label can be determined by the transmission or shielding of emitted light.

It should be noted that, as the material sheet assembly for manufacturing the printed labels, one in which the first release liner is attached to one surface of an elongated label base in a belt shape by means of an adhesive is used. As for this material sheet assembly, the first release liner is released midway in the feeding course by leaving the adhesive on the label substrate, and the release liner is taken up by the take-up device. In the feeding process using the feeding device, printing is effected on the adhesive surface of the label base after being separated from the first release liner, by means of a noncontact-type printer, thereby forming a printed label. This printed label can be attached to the adherend with the adhesive surface facing the adherend. In the attached state, the printed surface is sandwiched between the label base and the adherend, so that the rubbing off and staining of the characters can be prevented.

In addition, an apparatus for attaching printed labels in accordance with the present invention comprises: a paying-out device provided in such a manner as to be capable of paying out in a predetermined direction a material sheet assembly in which a label base is attached to a release liner by means of an adhesive; sucking means for integrally separating and sucking the label base and the adhesive, which have been paid out, from the release liner; and a noncontact-type printer for printing on a surface of the label base where the adhesive is provided. The material sheet assembly particularly suited to this manufacturing apparatus is comprised of a belt-shaped release liner and a multiplicity of label bases each formed in advance into the shape of a label and attached to the release liner.

Each of the label bases paid out by the paying-out device is sucked by the sucking means located on the paying-out-direction side. When the label base is sucked, the label base together with the adhesive is separated from the release liner, whereupon the label base is moved in a predetermined direction by the moving device. In this moving process, predetermined printing is effected on the surface on the side where the adhesive is provided by means of a noncontact-type printer. The printed label thus manufactured is further moved toward the adherend by the moving device, and is attached to the adherend at a predetermined attaching position thereof.

A method of attaching a printed label in accordance with the present invention comprises the steps of: separating a label base attached to a release liner by means of an adhesive from the release liner, together with the adhesive; forming a printed label by printing on the surface of the printed label where the adhesive is provided, by using a noncontact-type printer; and attaching the printed label to a predetermined adherend with a printed surface disposed between the printed label and the adherend.

Furthermore, an apparatus for attaching printed labels in accordance with the present invention comprises: a paying-out device provided in such a manner as to be capable of paying out in a predetermined direction a material sheet assembly in which a label base is attached to a release liner by means of an adhesive; sucking means for integrally separating and sucking the label base and the adhesive, which have been paid out, from the release liner; a noncontact-type printer for printing on a surface of the label base where the adhesive is provided; and moving means for moving the sucking means toward the adherend and moving the printed label sucked onto the sucking means to a predetermined attaching position for attaching the printed label to the adherend, so as to attach the printed label to the adherend.

The printed label is provided with such a form that the printed surface is sandwiched between the label base and the adherend in the state in which the label is attached to the adherend. Hence, it is possible to effectively prevent the rubbing off or staining of the printed characters and/or codes. In this state, the number of constituent layers of the printed label can be set to two, excluding the printed character/code layer (ink layer) which is provided partially.

The above-described printed label can be suitably used as a label for displaying a source or quality and constituted by characters, codes, or the like, as well as a printer label of such as a bar code for a POS system. In addition, the printed label in accordance with the present invention can also be used as a falsification-preventing label in which the opening of the label can be detected as a strain is produced in the adhesive or a crack occurs in the adhesive layer when the label is peeled off, or as a falsification-preventing label in which the printed surface is formed on the adhesive surface in a special method to prevent the making of a false label easily. Further, in a case where printing is effected on an opaque portion of the base and the corresponding portion of the adherend is also opaque, the label in accordance with the present invention can be used as a concealed label.

In addition, although the label base in the present invention should preferably be a transparent one, in a form in which the printed surface is exposed through the adherend, It is possible to use an opaque label base.

The above and other objects, features and advantages of the present invention will become more apparent from the following detailed description of the invention when read in conjunction with the accompanying drawings.

DETAILED DESCRIPTION OF THE PREFERRED EMBODIMENTS

Hereafter, a detailed description will be given of the embodiments of the present invention with reference to the accompanying drawings.

First Embodiment

Figure 1:
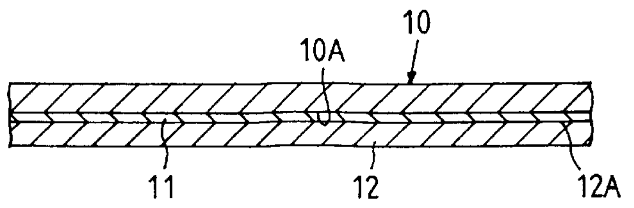
FIG. 1 is a partial cross-sectional view of a material sheet assembly illustrating an example of a printed label in accordance with a first embodiment.
Figure 2:
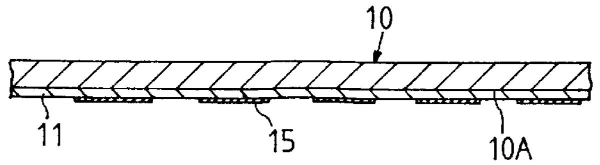
FIG. 2 is a cross-sectional view illustrating a printed label in the embodiment.
Figure 3:
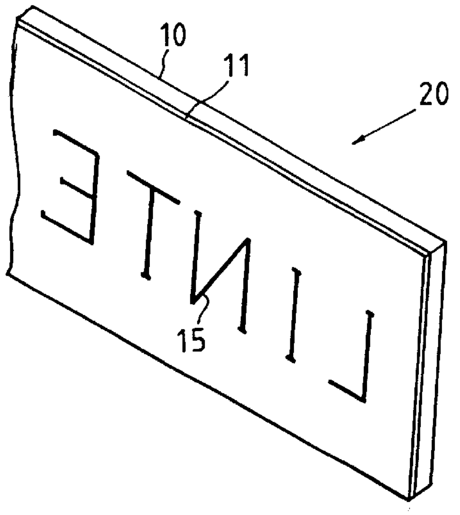
FIG. 3 is a schematic perspective view in which the printed label shown in FIG. 2 is seen from the printed surface side.

FIG. 1 shows a cross section of a label base before a printed label is manufactured. FIGS. 2 and 3 respectively show a partial cross-sectional view and a perspective view of a printed label after printing has been effected. In FIG. 1, one surface 10A, located on the lower side in the drawing, of the transparent label base 10 formed of an appropriate synthetic resin is attached to a releasing surface 12A of a release liner 12 constituted by paper, a film or the like by means of an adhesive 11. The adhesive 11 in this embodiment is provided on all of the surface 10A.

The label base 10 is formed to be substantially rectangular in its planar configuration, while the release liner 12 is provided in the shape of an elongated continuous belt. An assembly of these laminated sheets is supported on a predetermined reel as a material sheet assembly. The adhesive 11, which is provided on the surface 10A of the label base 10, preferentially adheres to the label base 10 when the label base 10 is separated from the release liner 12, so that the release liner 12 is released without the adhesive 11 remaining thereon.

The printing on the label base 10 is effected by an ink-jet printer serving as a noncontact-type printer, which will be described later, after release from the release liner 12. The printing surface is one which is on the side where the adhesive 11 is provided. Accordingly, characters and/or codes 15 to be printed are printed in a state in which the left and right sides of the characters and/or codes 15 are reversed. As shown in FIG. 3, when the assembly is attached to an adherend, a printed label 20 capable of displaying correct characters and/or codes is formed.

Referring now to FIGS. 4 to 7, a description will be given of the manufacture of the printed labels 20 and an apparatus for attaching the printed labels 20.

Figure 4:
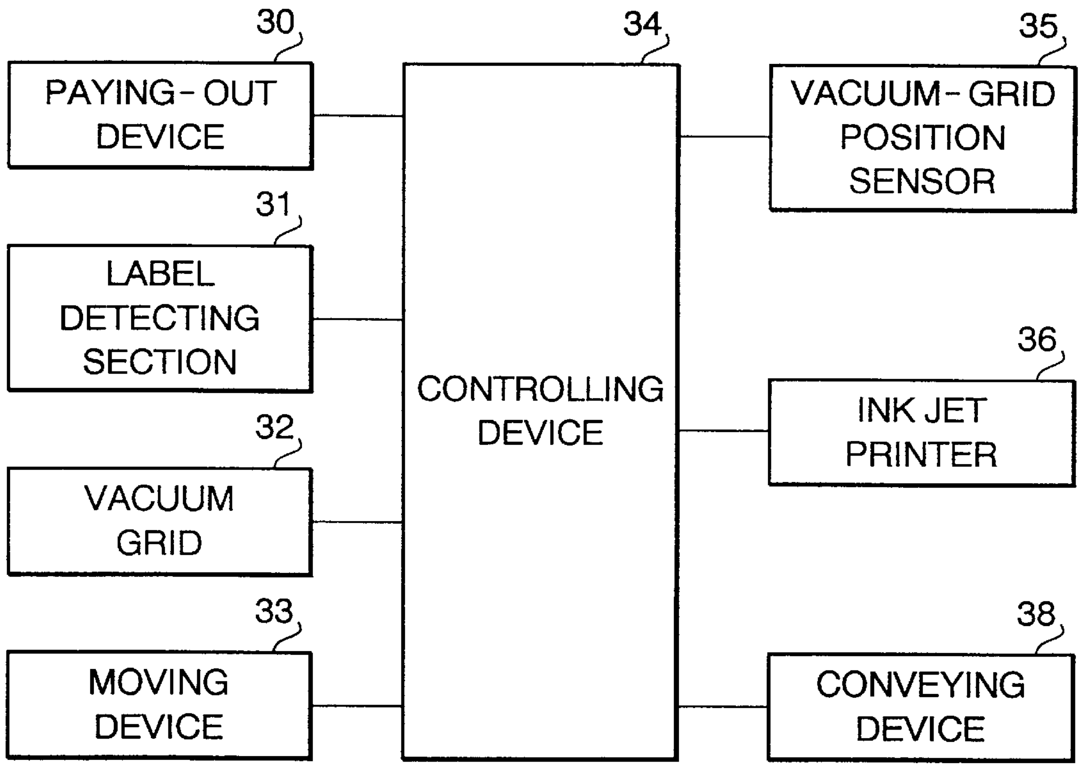
FIG. 4 is a schematic block diagram of an apparatus in accordance with the embodiment.
Figure 5:
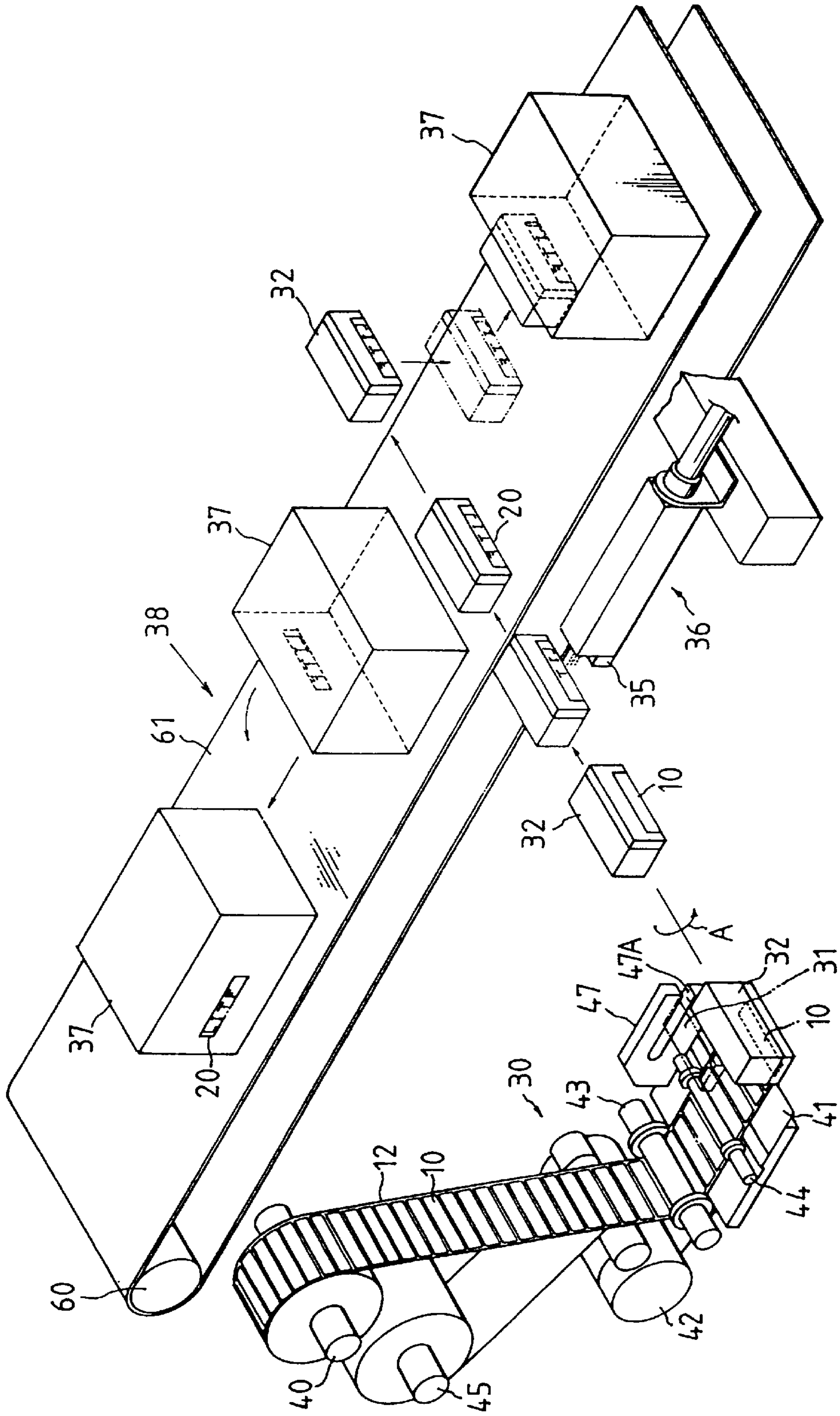
FIG. 5 is a schematic perspective view of the apparatus of the embodiment.

As shown in FIGS. 4 and 5, the apparatus of this embodiment is comprised of the following: a paying-out device 30 for consecutively paying out in a predetermined direction the label base 10 set in a state of the material sheet assembly and attached to the release liner 12 by means of the adhesive 11; a label detecting section 31 disposed on the paying-out-direction side of the paying-out device 30 so as to detect the presence or absence of the label base 10; a vacuum grid 32 constituting a sucking means for releasing the paid-out label base 10 together with the adhesive 11 by sucking them; a moving device 33 for moving the vacuum grid 32 to a predetermined label-attaching position; a controlling device 34 for driving the paying-out device 30 and the like in a predetermined manner; a vacuum-grid position sensor 35 for detecting that the vacuum grid 32 being moved by the moving device 33 has reached a predetermined printing position, a detection signal thereof being capable of being outputted to the controlling device 34; an ink-jet printer 36 serving as a noncontact-type printer for forming the printed label 20 by printing the pre-inputted characters and/or codes 15 (see FIG. 3) on the basis of the result of detection by the vacuum-grid position sensor 35; and a conveying device 38 disposed in the vicinity of the ink-jet printer 36 and provided in such a manner as to be capable of consecutively conveying adherends 37 to which the printed labels are attached.

As shown in FIG. 5, the paying-out device 30 is comprised of the following: a material-sheet-supporting reel pin 40; a peel plate 41 disposed horizontally below the material-sheet-supporting reel pin 40; a drive roll 42 disposed laterally of the peel plate 41 and provided in such a manner as to be capable of intermittently paying out the label base 10 for each unit thereof; two guide rolls 43 and 44 disposed on the upper-surface side of the peel plate 41; and a take-up roll 45 provided in such a manner as to be capable of consecutively taking up the release liner 12 released from the label base 10 and the adhesive 11 by the peel plate 41.

The label base 10 which is paid out together with the release liner 12 by the paying-out device 30 is adapted to pass over the upper surface of the peel plate 41, and the label base 10 is separated from the release liner 12 as the release liner 12 is inverted and is passed underneath the lower surface of the peel plate 41.

Figure 6:
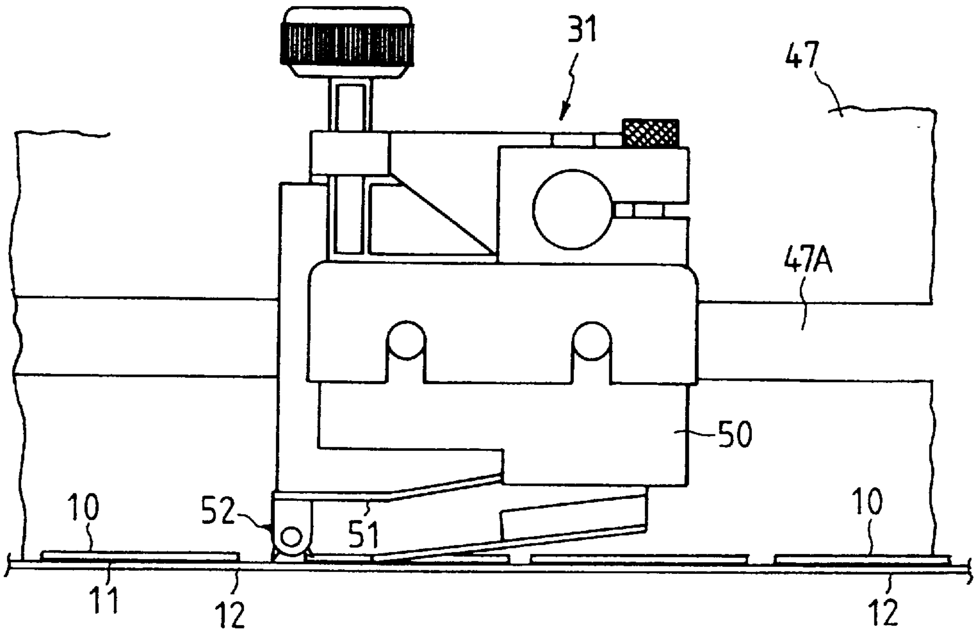
FIG. 6 is a front elevational view of a label detecting section in the embodiment.
Figure 7:
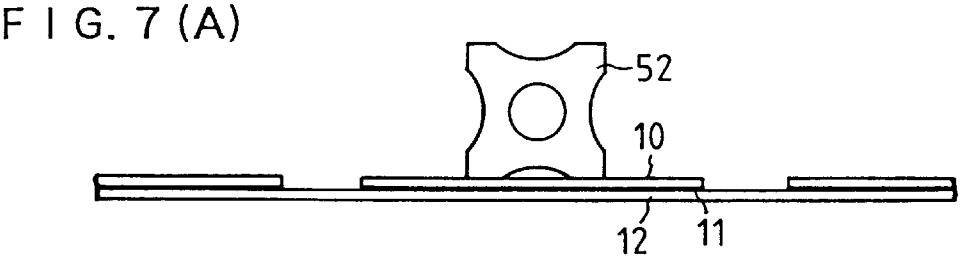
FIG. 7(A) is an explanatory diagram illustrating an off state of a label detecting sensor.
FIG. 7(B) is an explanatory diagram illustrating an on state of the label detecting sensor.
Figure 7:
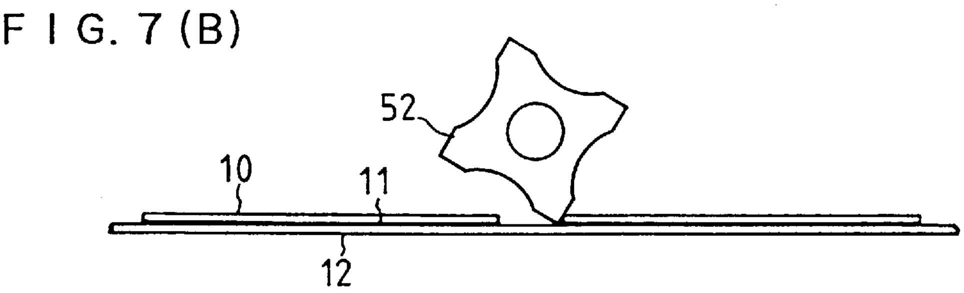

The label detecting section 31 is supported by a micro-switch sliding plate 47 juxtaposed laterally of the peel plate 41, and its installing position is adjustable in the horizontal direction along a slit 47A formed in this block 47. As shown in FIGS. 6 and 7, this label detecting section 31 has a square wheel 52 which is provided rotatably by means of a support arm 51 below a micro switch 50. The square wheel 52 is rotatable as it is caught by a leading edge of the label base 10. As shown in FIGS. 7(A) and 7(B), the label detecting section 31 physically detects the presence or absence of the label base 10 on the basis of the positional change of the square wheel 52, and is capable of outputting the result to the controlling device 34. Specifically, in the state shown in FIG. 7(A), the micro switch 50 of the label detecting section 31 is turned off to allow the paying out of the label base 10, whereas, in the state shown in FIG. 7(B), the micro switch 50 is turned on to stop the paying-out operation until the operation of paying out an ensuing label base 10 is started. The on-off signal of the micro switch 50 and, hence, the label detecting section 31 is imparted to the controlling device 34, and the intermittent rotative driving of the drive roll 42 is controlled by the controlling device 34.

As shown in FIG. 5, the vacuum grid 32 is positioned such that a position located adjacent to the label-paying-out direction side of the peel plate 41 is set as an initial position.

This vacuum grid 32 is connected to an unillustrated device for generating a vacuum by compressed air, and is provided with a plurality of suction holes in a lower end surface thereof as viewed in FIG. 5. Accordingly, when the vacuum generating device is driven, the label base 10 can be sucked onto an area where the suction holes are formed. Additionally, the vacuum grid 32 is connected to the moving device 33 (see FIG. 4), and is provided in such a manner as to be rotatable by 90 degrees by the moving device 33 in the direction of arrow A in FIG. 5, so that the vacuum grid 32 is capable of moving the sucked label base 10 with the adhesive 11 to a position above the conveying device 38 in a state in which the surfaces of the sucked label base 10 and the adhesive 11 are set substantially vertically.

Although a detailed structure of the moving device 33 is omitted here, the moving device 33 may be constituted by a known robot in which an appropriate arm and the like are provided on an upright support shaft, and the vacuum grid 32 is coupled to the arm to make the vacuum grid 32 movable in a three-dimensional direction.

As shown in FIG. 5, the vacuum-grid position sensor 35 is fixed to a distal end of the ink-jet printer 36, and is capable of optically detecting that the label base 10 sucked onto the vacuum grid 32 has reached the printing position by means of the moving device 33. When the printing position is detected by the vacuum-grid position sensor 35, a printing command signal is outputted to the ink-jet printer 36 on the basis of the detection signal thereof, and ink is jetted by the ink-jet printer 36 in response to the printing command signal, thereby allowing the characters and/or codes 15 inputted in advance to be printed onto the adhesive 11. The inputting of the characters and/or codes 15 to be printed by the ink-jet printer 36 can be effected directly by providing the ink-jet printer 36 with an input section, or can be effected by means of the controlling device 34.

The conveying device 38 is comprised of rotatable rollers 60 supported horizontally, a conveying passage 61 formed by an endless belt or the like which is revolved by the rollers 60, an unillustrated drive motor for revolving the conveying passage 61, and so on. The adherends 37 are conveyed on the conveying passage 61 at fixed timings, and the orientation of the adherends 37 may be changed, as required, after the attachment of the printed labels 20, so as to be sent for subsequent conveying processing. Disposed at a predetermined location above the conveying device 38 is an unillustrated sensor for detecting that the adherend 37 to which the printed label 20 is to be attached has passed a predetermined position on the conveying passage 61. The detected result of the sensor is outputted to the controlling device 34 to establish synchronization between the paying-out timing of the label base 10 and the moving timing of the moving device 33 and the like.

Figure 8:
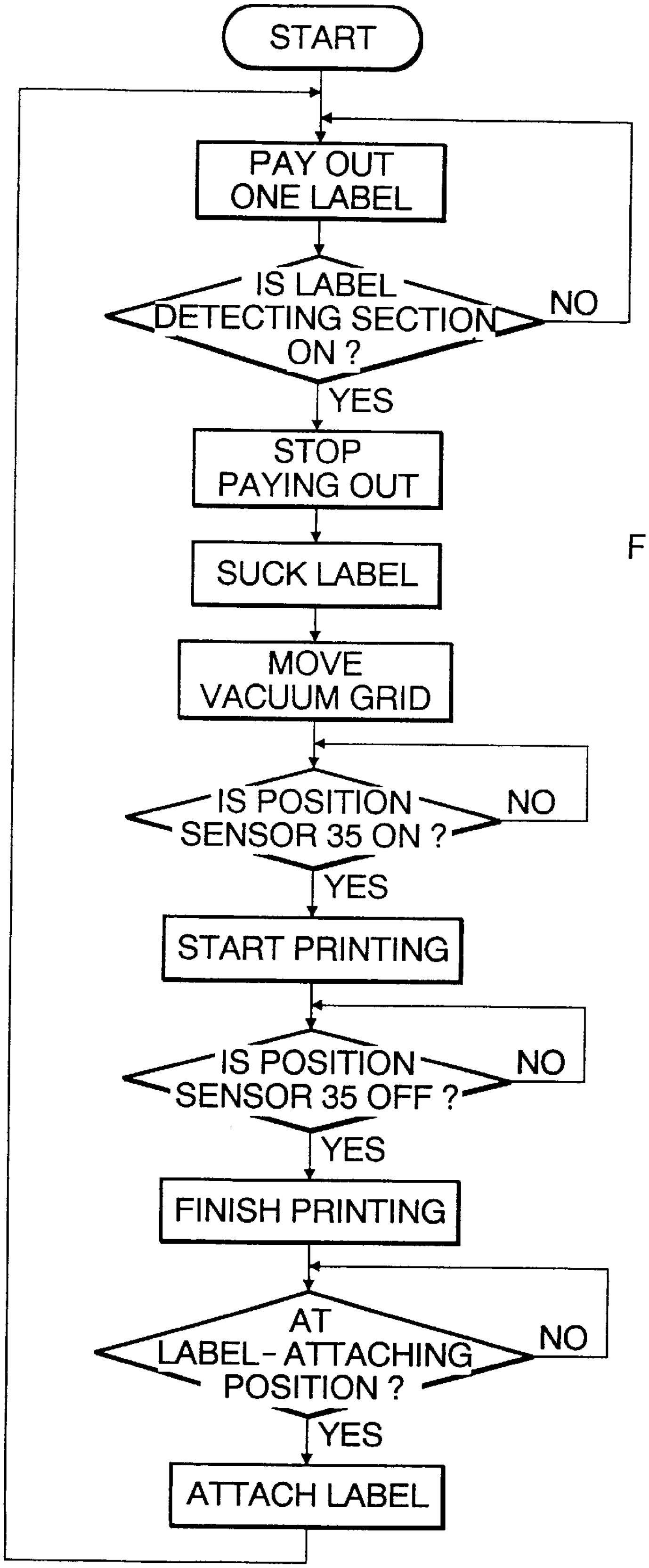
FIG. 8 is a flowchart explaining a label manufacturing process and a label attaching process in accordance with the embodiment.

Next, referring to FIG. 8 as well, a description will be given of a method of manufacturing labels and an attaching method in accordance with this embodiment.

Here, it is assumed that the vacuum grid 32 is stopped at the initial position shown in FIG. 5, and that the adherends 37 are being conveyed on the conveying passage 61 at a predetermined conveying speed by the conveying device 38. Also, it is assumed that the characters and/or codes 15 to be printed have already been inputted to the ink-jet printer 36, and that other initial settings have also been completed.

When the power supply is turned on by the controlling device 34, and a start signal is inputted, the drive roll 42 of the paying-out device 30 is driven, the label base 10, i.e., a one-unit portion, is paid out. During this paying-out operation, the state becomes the one shown in FIG. 7(A), and the label detecting section 31 maintains the off state to allow the paying-out operation to be effected without being stopped. Here, when the paying out of one unit of the label base 10 is completed, the square wheel 52 is displaced to the state shown in FIG. 7(B), at which time an on signal is outputted from the label detecting section 31, thereby stopping the paying out of one unit of the label base 10. Through this paying-out operation, the label base 10 on the release liner 12 drawn out from the state of the material sheet assembly is separated together with the adhesive 11 by the peel plate 41, and is sucked onto the vacuum grid 32. The label base 10 sucked onto the vacuum grid 32 is moved toward the ink-jet printer 36 while being rotated by approximately 90 degrees by the moving device 33 such that the surfaces of the label base 10 and the adhesive 11 are set substantially vertically.

When the vacuum grid 32 is further moved by the moving device 33, and the vacuum-grid position sensor 35 provided at the distal end of the ink-jet printer 36 is turned on, ink is ejected from the ink-jet printer 36 to effect a predetermined printing operation. When the characters and/or codes 15 are thus printed on the surface of the adhesive 11, and the vacuum-grid position sensor 35 subsequently detects the position of a printing end, the printing operation of the ink-jet printer 36 is completed in response to an off signal from the position sensor 35.

Upon completion of printing, the moving device 33 moves the vacuum grid 32 to a position above the conveying passage 61 of the conveying device 38. Here, where the vacuum grid 32 reaches a label attaching position, the printed label is attached to a side surface of the adherend 37 being conveyed on the conveying passage 61 at a predetermined timing.

The adherend 37 with the printed label 20 attached thereto is further conveyed on the conveying passage 61 and is subjected to subsequent processing. Meanwhile, the vacuum grid 32 is returned to its initial position by the moving device 33. Thereafter, the paying out of the material sheet assembly constituted by the label base 10, the release liner 12, and the like for each unit, the printing onto the surface of the adhesive 11 on the label base 10, and the attachment of the printed label 20 are effected for each unit portion in a similar manner.

Accordingly, in accordance with this embodiment, as for the printed label 20 which is attached to the adherend 37, printing can be effected directly on the adhesive 11. As a result, the characters and/or codes 15 are sandwiched between the adhesive 11 and the adherend 37 in the state in which the printed label 20 is attached to the adherend 37, thereby making it possible to obtain the printed label 20 in which the characters and/or codes 15 are not directly exposed on the outer surface. Hence, there is an advantage in that the printed state can be always made stable and the characters and/or codes 15 can be effectively protected from becoming blurred.

Moreover, since the number of the layers of the structure of the printed label 20 can be positively reduced as compared to the conventional example, the amount of projection of the printed label 20 from the surface of the adherend 37 becomes minimal, and practically no step is formed. Hence, the peeling of the printed label 20 due to rubbing can be prevented. In addition, it is possible to effectively attain a reduction in the number of steps in manufacturing the printed labels 20 and a substantial reduction of the manufacturing cost through the reduction in the materials consumed.

Furthermore, in the printed labels 20 in this embodiment, printing and attaching can be effected substantially during the same period in a series of steps. Thus, by installing the apparatus of this embodiment in a desired location in the production line handling the adherends 37, it is possible to execute the various processing described above in a single work site, thereby making it possible to attain labor saving as well.

In addition, since the ink-jet printer 36 is used as a noncontact-type printer, printing on the surface of the adhesive becomes possible, and by directly attaching the printed surface onto the adherend, it is possible to effectively prevent the rubbing off or staining of the print. Moreover, in this embodiment, printing information can be varied in real time, so that it is possible to manufacture printed labels having various display contents as the user inputs various information.

It should be noted that the manner in which the various components or sections of the apparatus in the above-described embodiment are disposed should not be limited to the illustrated examples, and may be carried out by making appropriate changes in disposition. For instance, in the above-described embodiment the vacuum grid 32 is rotated by approximately 90 degrees such that the surface of the adhesive 11 is set in a substantially vertical plane; however, if the distal end of the ink-jet printer 36 is arranged to be directed upward, the aforementioned rotation of the vacuum grid 32 becomes unnecessary. In this case, an arrangement is adopted in which the printed label 20 is attached to the upper surface of the adherend 37 from above. In addition, although, in the above-described embodiment, by way of illustration an example has been described in which the vacuum grid 32 is adopted as the sucking means, the vacuum grid 32 may be replaced by another sucking means, e.g., a suction belt arranged by having at least one belt, a vacuum pad arranged by having at least one pad, a suction drum arranged by having at least one drum, or the like. In short, the sucking means in the present invention can be implemented in a similar manner insofar as it is capable of effecting the above-described separation.

In addition, by way of illustration, an example has been described in which the adhesive 11 is provided on all of one surface 10A of the label base 10, the present invention is not limited to the same, and the adhesive 11 may be formed partially insofar as the printed label 20 can be stably attached to the adherend 37. In this case, the area in which the adhesive 11 may be formed, for example, on an outer peripheral area of the label base 10. Accordingly, if such an arrangement is adopted, printing would be directly printed on one surface 10A of the label base 10 on the side where the adhesive 11 is provided. In short, in the present invention, the size or the area where the adhesive 11 is formed is not particularly restricted insofar as a state of fixed attachment to the adherend 37 can be maintained, and various modifications may be adopted if the arrangement provided is such that the characters and/or codes 15 are not directly exposed on the outer surface side.

Furthermore, in the above-described embodiment, by way of illustration, an example has been described in which the label base 10 and the printed label 20 are transparent, but the present invention is not limited to the same. For example, if the adherend 37 is formed of a transparent material, since the characters and/or codes 15 on the printed label 20 can be viewed through the adherend 37, it is possible to use a nontransparent label. In this case, it suffices if the characters or codes are printed in not reversed but correct form unlike in the above-described embodiment.

Second Embodiment

Next, a description will be given of a second embodiment of the present invention with reference to FIGS. 9 to 11.

Figure 9:
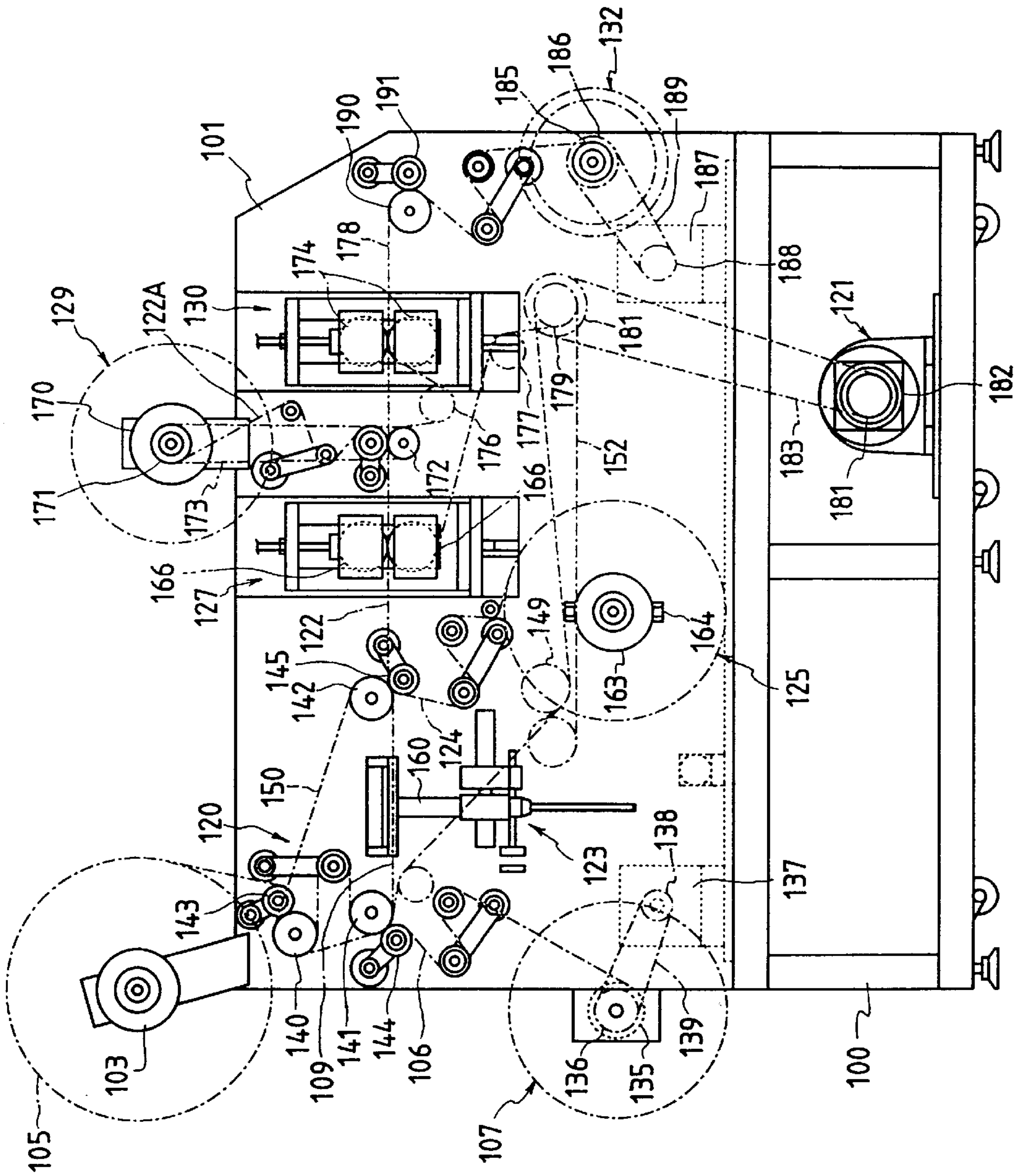
FIG. 9 is a schematic front elevational view illustrating an embodiment of an apparatus for manufacturing printed labels in accordance with a second embodiment.

FIG. 9 shows a schematic front elevational view of a label manufacturing apparatus in accordance with the present invention. FIG. 10 shows a right-hand side elevational view thereof. Additionally, FIG. 11 shows a conceptual diagram illustrating the operation in the apparatus. It should be noted that, in FIG. 10, the Illustration of the group of rolls and the like shown in FIG. 9 is partially omitted to avoid the complication of the drawings. In these drawings, the label manufacturing apparatus is comprised of the following: a frame 101 provided uprightly on an upper portion of a base 100; a material-sheet holding roll 103 disposed in an upper portion of the frame 101; a take-up device 107 for taking up a first release liner 106 in the step of feeding a material sheet assembly 105 held on the material-sheet holding roll 103 starting with a leading end thereof; a feeding device 120 for feeding to an ensuing stage a label base 109 after the release of the first release liner 106 in a state in which the adhesive agent surface side of the label base 109 is set on the lower surface side; a driving means 121 constituted by a motor and the like for imparting a driving force to the feeding device 120 by means of a transmitting mechanism which will be described later; an ink-jet printer 123 serving as a noncontact-type printer for forming a printed label 122 by printing on the adhesive-surface side of the label base 109; a release-sheet supplying mechanism 125 for supplying a second release liner 124 to the printed surface side of the printed label 122 in the step of further feeding the printed label 122; a first die cutter 127 for providing slits in the label base 109 for each printing unit of the printed label 122 to form the printed label 122 into the shape of a final label; a collecting device 129 for collecting an outer portion 122A of the printed label 122 produced as a result of the slitting; a second die cutter 130 disposed in a stage following the first die cutter 127 to form perforations in the second release liner 124; and a label take-up device 132 for taking up the printed label 122 together with the second release liner 124.

The take-up device 107 is comprised of a take-up shaft 135; a pulley 136 secured to the take-up shaft 135; an AC servo motor 137; a pulley 138 fixed to an output shaft of the AC servo motor 137; and a belt 139 trained between the pulleys 136 and 138. The AC servo motor 137 is capable of appropriately varying the rotating speed of the take-up shaft 135, and controls the rotating speed of the take-up shaft 135 as the take-up diameter increases, thereby to maintain the take-up tension in a fixed state.

As shown in FIG. 9, the feeding device 120 is comprised of a plurality of feed rolls 140 to 142 and pinch rolls 143 to 145 disposed in correspondence with the feed rolls 140 to 142, respectively. As shown in FIG. 10, pulleys 146 to 148 are secured coaxially to the shafts of the feed rolls 140 to 142, and a belt 150 is trained around the pulleys 146 to 148 and a drive pulley 149 (see FIG. 9). An unillustrated pulley is disposed coaxially on the shaft of the drive pulley 149, and this pulley can be rotated by a belt 152 serving as a driving-force transmitting mechanism, whereby the synchronous rotation of the pulleys 146 to 148 is effected, and the feed rolls 140 to 142 disposed coaxially therewith are rotated, thereby making it possible to draw out the material sheet assembly 105 and feed the label base 109 following the same.

In the same way as in the first embodiment, the ink-jet printer 123 is capable of inputting variable printing information by an unillustrated input means. A print head 160 of the ink-jet printer 123 is disposed by being slightly spaced apart from the adhesive surface on the label base 109. In printing by the print head 160, if it is assumed that a label with "PL" printed thereon, for instance, is to be manufactured, as shown in FIG. 11, printing is effected in the order of "L" and "P." If printing is effected in the order of "P" and "L," inverted characters thereof are printed. By performing such printing, the printed label 122 is formed. As shown in FIG. 9, a viewing plate 161 formed of a glass sheet or the like is disposed at a position above the print head 160, and if the operator views the printed state from above through the viewing plate 161, it is possible to visually confirm the printed state.

The release-liner supplying mechanism 125 is capable of continuously supplying the second release liner 124 along the adhesive surface of the printed label 122, i.e., the printed surface. This release-liner supplying mechanism 125 is comprised of a release-liner holding roll 163 for feedably holding the second release liner 124, as well as a frictional brake 164 juxtaposed to the release-liner holding roll 163. The frictional brake 164 serves to impart supplying resistance to the second release liner 124 so as to supply the second release liner 124 while maintaining a fixed tension.

The first die cutter 127 is comprised of a pair of upper and lower die cut rolls 166. A number of unillustrated cutters which are substantially rectangular in a plan view are formed at regular intervals on the peripheral surface of the upper die cut roll 166, and slits for forming the printed label 122 into the shape of each final label are provided in the label base 109 by these cutters.

Figure 10:
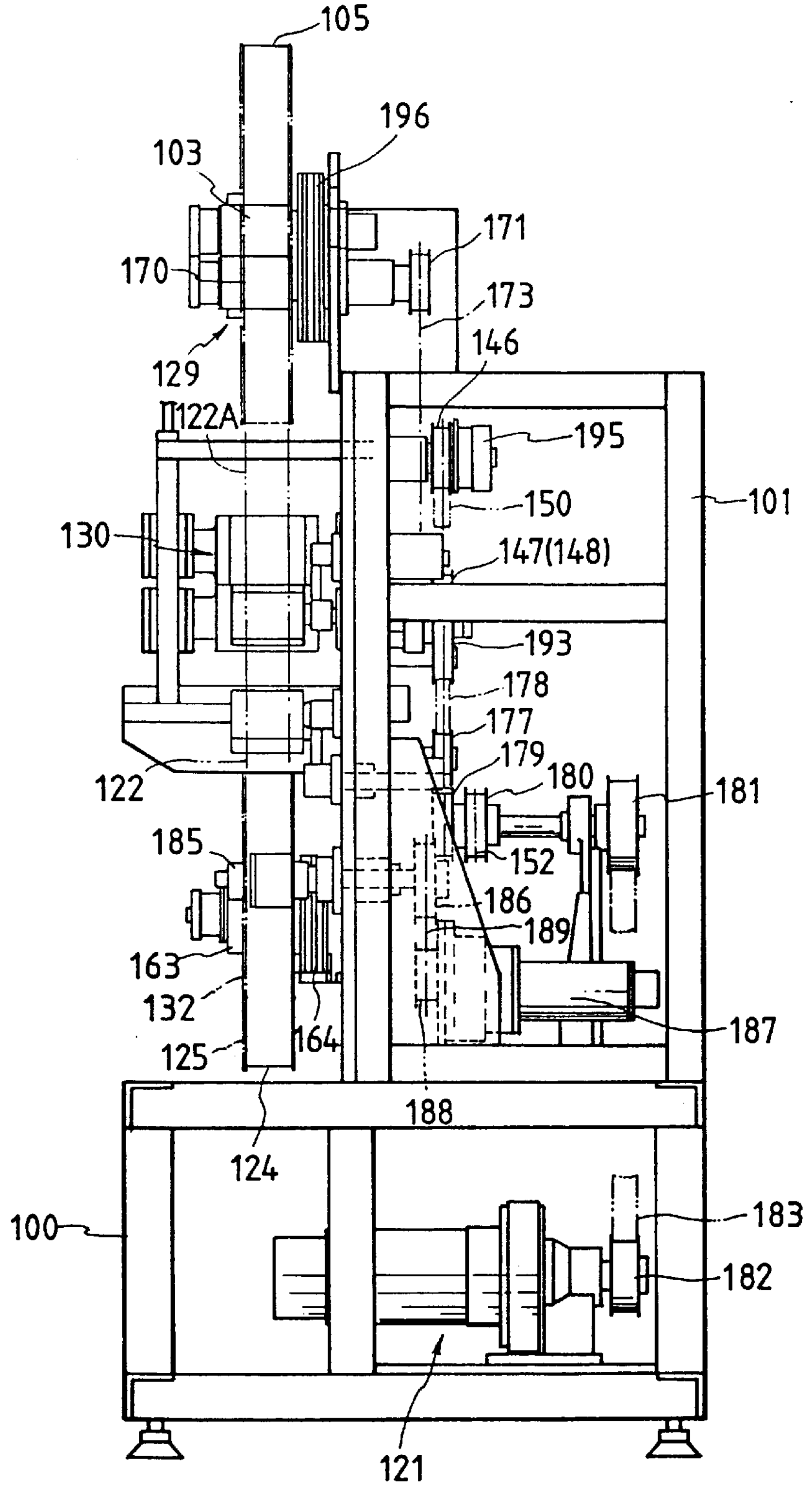
FIG. 10 is a schematic right-hand side elevational view of FIG. 9 in which a part of the apparatus is omitted.

The outer portion 122A of the printed label 122 in which the slits are formed by the die cut roll 166 can be consecutively taken up by the collecting device 129, as also shown in FIG. 10. This collecting device 129 is comprised of a take-up roll 170, a driven pulley 171 disposed coaxially on the shaft of the take-up roll 170, a drive pulley 172 (see FIG. 9) disposed below the driven pulley 171, and a belt 173 trained between these pulleys 171 and 172. In a state in which the outer portion 122A of the printed label 122 has been collected by the collecting device 129, only the printed label 122 formed into the shape of the final label remains on the upper surface of the second release liner 124 (see FIG. 11).

The second die cutter 130 is also comprised of a pair of upper and lower die cut rolls 174 in the same way as the first die cutter 127. The lower die cut roll 174 has a plurality of projecting punches on its peripheral surface, and perforations 175 (see FIG. 11) are formed in the second release liner 124 on transverse sides thereof by these punches.

In the first and second die cutters 127 and 130, unillustrated pulleys are respectively secured to rotating shafts of the lower die cut rolls 166 and 174. As shown in FIG. 9, a belt 178 is trained around these pulleys and pulleys 176 and 177 disposed in the vicinities of the second die cutter 130. This belt 178 is also wound around a pulley 179 disposed at a position lower than that of the pulley 177. As shown in FIG. 10, a large-diameter pulley 181 and a pulley 180 around which the belt 152 serving as the driving-force transmitting mechanism is wound are provided coaxially on the shaft of the pulley 179. A belt 183 is trained between the large-diameter pulley 181 and a pulley 182 secured to the output shaft of the driving means 121. Further, the belt 178 is also wound around an unillustrated pulley provided coaxially on the shaft of the drive pulley 172 of the collecting device 129, whereby the drive pulley 172 can be rotatively driven, and, consequently, the take-up roll 170 of the collecting device 129 can be rotated.

The printed labels 122 which are fed out via the second die cutter 130 are continuously taken up by the label take-up device 132. In the same way as the take-up device 107 for the first release liner 106, this label take-up device 132 is comprised of a take-up shaft 185, a pulley 186 secured to the take-up shaft 185, an AC servo motor 187, a pulley 188 secured to the output shaft of the AC servo motor 187, and a belt 189 trained between the pulleys 186 and 188. The AC servo motor 187 is capable of appropriately adjusting the take-up speed of the take-up shaft 185 in response to an increase in the diameter of the taken-up printed labels 122.

A feed roll 190 for the printed labels 122, a pinch roll 191 facing the feed roll 190, and the like are disposed between the label take-up device 132 and the second die cutter 130. As shown in FIG. 10, a pulley 193 is provided coaxially on the shaft of the feed roll 190, and the belt 178 is wound around this pulley 193.

Incidentally, in FIG. 10, reference numeral 195 denotes an electromagnetic clutch, and numeral 196 denotes a friction clutch.

Next, a description will be given of the operation of a second embodiment.

First, in the initial operation, the material sheet assembly 105 prepared in advance is set on the material-sheet holding roll 103. The material sheet assembly 105 is separated into the label base 109 and the first release liner 106 by the operator. Then, the label base 109 is pulled out up to the label take-up device 132, and the second release liner 124 is attached to the adhesive surface midway therebetween, and these two sheets are thus formed integrally and secured to the take-up shaft 185. Meanwhile, a leading end of the first release liner 106 is secured to the take-up shaft 135 of the take-up device 107.

When a predetermined power supply is turned on and the driving means 121 is driven, the belt and the pulleys connected to the driving means 121 are rotated, and a driving system such as the feeding device 120 is driven synchronously. At this time, the take-up device 107 for the first release liner 106 and the label take-up device 132 are respectively rotatively driven by their AC servo motors 137 and 187 individually.

Figure 11:
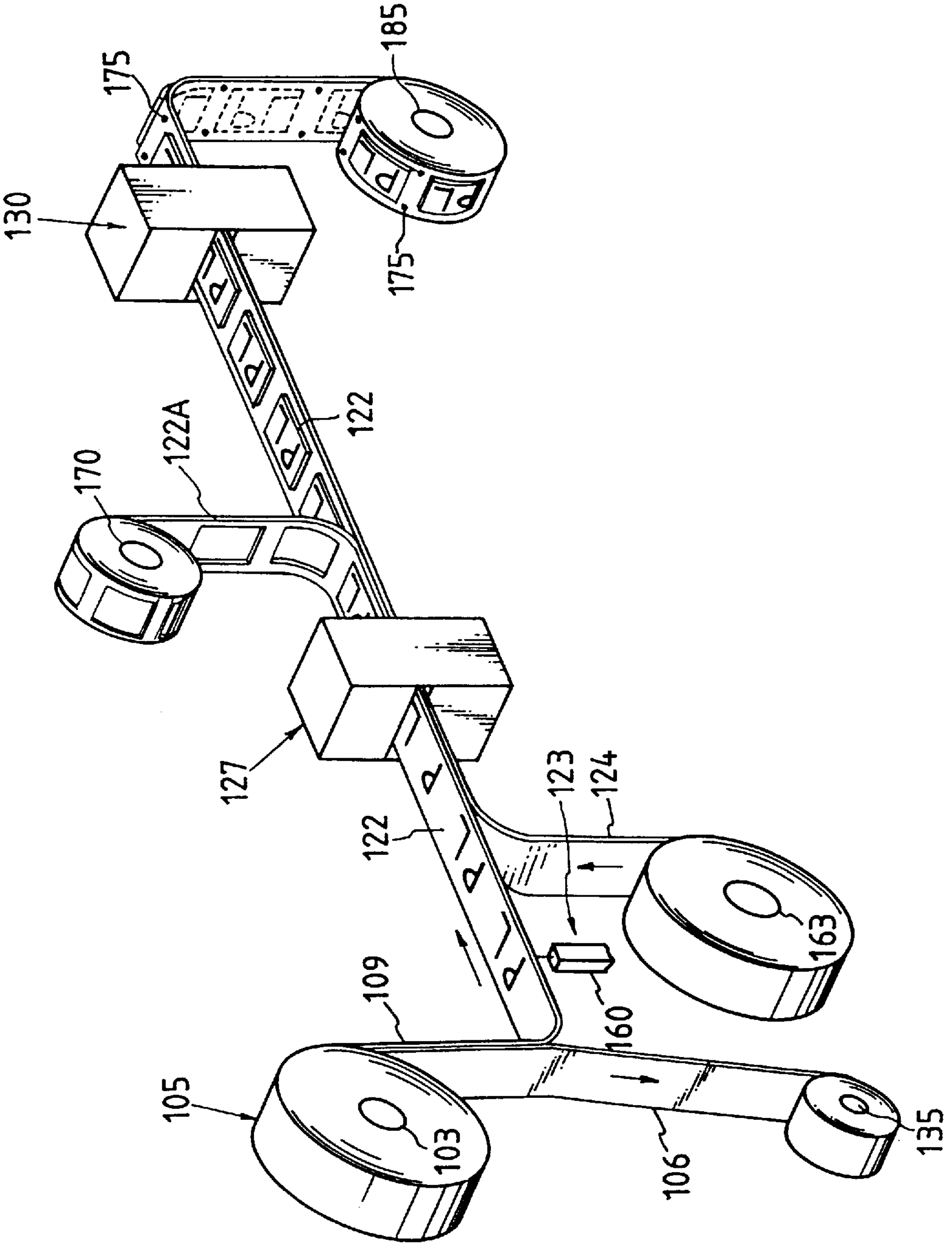
FIG. 11 is a diagram explaining the operation of the second embodiment.

When the overall driving is thus started, as shown in FIG. 11, the first release liner 106 is consecutively taken up onto the take-up shaft 135 of the take-up device 107, while the printed label 122 is formed on the adhesive-surface side of the label base 109 by the ink-jet printer 123. The second release liner 124 which is consecutively supplied by the release liner supplying device 125 is attached to the printed label 122 to cover the printed surface.

Next, slits in the shape of a predetermined label are provided by the first die cutter 127, and the outer portion 122A of the printed label 122 produced as a result of the slitting is collected by being taken up onto the take-up roll 170 of the collecting device 129. In this state, the printed label 122 is peeled off the second release liner 124 to assume a state for being attached to a predetermined adherend.

The printed label 122 formed in the shape of a label and the second release liner 124 integrally pass through the second die cutter 130 disposed in a subsequent stage. At this time, as shown in FIG. 11, the perforations 175 are formed in the second release liner 124 at two positions on transverse sides thereof. These perforations are used for the determination of the presence or absence of a label by the detection of the position of the perforations 175 when the roll of the taken-up printed labels 122 is set in an apparatus for automatically attaching the printed label 122, as described before.

The printed label 122 after passing through the second die cutter 130 is taken up together with the second release liner 124 in roll form by the label take-up device 132. In that state, the roll of the printed labels 122 is made suitable for storage, transportation, and the like, and permits the attachment of the printed labels 122 one at a time by being set in the automatic attachment apparatus in a different process.

Accordingly, in accordance with this second embodiment, since the arrangement provided is such that the label base 109 and the first release liner 106 are separated from each other in the feeding step, and printing is effected on the adhesive surface on the label base 109 after separation, it is possible to use the generally used material sheet assembly 105. Hence, it is possible to obtain an advantage in that the printed labels 122 can be manufactured in a series of steps without needing to form the label base cut to a predetermined label shape as in the first embodiment.

In addition, since the printed surfaces are protected by attaching the second release liner 124 to the printed labels 122, if that state is maintained, the printed labels 122 can be made suitable for storage, transportion, and the like, so that the attachment of the labels is made possible in a different process.

Although, in the above-described second embodiment, the arrangement adopted is such that the first release liner 106 is taken up by the take-up device 107, the present invention is not limited to the same, and it is possible to adopt an arrangement in which the first release liner 106 is directly supplied again as the second release liner 124. Additionally, it is, of course, possible to adopt an arrangement in which the first release liner which can be obtained after completing the printed labels 122 by using one material sheet assembly 105 is utilized as the second release liner 124.

The means for transmitting each driving force including the feeding device 120 and the like are not limited to the examples of the illustrated configuration, and similar operation can be effected by making various changes in the design.

Furthermore, the label base 109 in the second embodiment is not confined to a transparent one, and an opaque label base may also be used.

Although, in the second embodiment, by way of illustration, an example has been described in which the adhesive surface is set on the lower surface side in terms of the posture for feeding the label base 109, the present invention is not limited to the same. For example, it is possible to adopt an arrangement in which the label base 109 is fed in a posture in which the surface of the label base 109 is set in a vertical plane, and printing is effected by the noncontact-type printer 123 in its process.

In addition, although, in the second embodiment, the second die cutter 130 is disposed between the first die cutter 127 and the label take-up device 132, the second die cutter 130 may be omitted, as required, as when the label base 109 is formed of a colored resin film or the like.

Moreover, although, in the first and second embodiments, a description has been given of the arrangement in which the ink-jet printers 36 and 123 are used as noncontact-type printers, it is possible to obtain operation and advantages similar to those described above even if other types of printers are used. For example, in addition to the ink-jet printer, it is possible to use a laser printer capable of printing by directly applying a laser beam onto the adhesive surface.

Since the present invention is arranged and operates as described above, the following unprecedented advantages are offered: The number of layers of the printed label can be reduced while maintaining the printed state satisfactorily, so that it is possible to provided a printed label which make it possible to lower the manufacturing cost due to the simplified structure. The printed labels can be consecutively attached to predetermined adherends while the printed labels are manufactured continuously in a series of steps. In addition, the printed labels can be manufactured speedily by using a general material sheet assembly as it is, and the printed labels as completed products can be stored or transported, and are suitable for being attached, as required, in a different process.

What is claimed is:

1. A method of manufacturing a roll of printed labels having a plurality of consecutively spaced labels, the method comprising the steps of:

separating a label base, which is attached to a release liner by means of an adhesive layer, from said release liner, together with said adhesive layer;

inputting desired characters and/or codes, in real-time during manufacture of the printed labels, to a noncontact-type printer;

forming a printed label by printing the characters and/or codes on one of the label base and said adhesive layer, using the noncontact-type printer, during manufacture of the printed labels to thereby create a roll of printed labels containing individual printed labels that have various display contents corresponding to printing information inputted by the user.

2. The method of claim 1, wherein adjacent labels can have different information printed thereon.

3. A method of manufacturing a roll of printed labels having a plurality of consecutively spaced labels, the method comprising the steps of:

preparing a material sheet assembly in which a first release liner is attached to a label base by means of an adhesive;

separating and taking up said first release liner by leaving said adhesive on said label base; and inputting desired characters and/or codes, in real-time during manufacture of the printed labels, to a noncontact-type printer;

printing on a surface of said adhesive, by means of the noncontact-type printer, while said separated label base is being fed out in a predetermined direction during manufacture of the printed labels to thereby create a roll of printed labels containing individual printed labels that have various display contents corresponding to printing information inputted by the user.

4. A method of manufacturing printed labels according to claim 3, further comprising the steps of:

attaching a second release liner to a printed surface side of said printed label;

providing slits in said label base in such a manner as to surround each predetermined printing unit; and collecting an outer portion of said printed label located outside said slits.

5. A method of manufacturing printed labels according to claim 4, further comprising the steps of:

after collecting the outer portion of said label, forming perforations in said second release liner at fixed intervals; and consecutively taking up said printed labels together with said second release liner.

6. The method of claim 3, wherein adjacent labels can have different information printed thereon.

7. A method of attaching a printed label which is in the form of a roll having a plurality of consecutively spaced labels, comprising the steps of:

separating a label base which is attached to a release liner by means of an adhesive layer from said release liner, together with said adhesive layer;

inputting desired characters and/or codes, in real-time during manufacture of the printed labels, to a noncontact-type printer;

forming a printed label by printing on one of the label base and said adhesive layer using the noncontact-type printer; and attaching said printed label to a predetermined adherend with a printed surface disposed between said printed label and said adherend;

wherein the inputted characters and/or codes allow construction of a roll of printed labels containing individual printed labels that have various display contents corresponding to printing information inputted by the user.

8. The method of claim 7, wherein adjacent labels can have different information printed thereon.

* * * * *